US012596778B2

(12) United States Patent (10) Patent No.: US 12,596,778 B2

Kuhne et al. (45) Date of Patent: Apr. 7, 2026

(54) SECURITY TECHNIQUES FOR BIOMETRIC KEYBOARD WITH CONTINUOUS READING FROM IN-LINE FINGERPRINT SENSORS

(71) Applicant: Cisco Technology, Inc., San Jose, CA (US)

(72) Inventors: Jason A. Kuhne, Hopkinton, MA (US); Steven Michael Holl, Sarasota, FL (US); Matthew Robert Engle, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 86 days.

(21) Appl. No.: 18/583,225

(22) Filed: Feb. 21, 2024

(65) Prior Publication Data

US 2025/0265320 A1 Aug. 21, 2025

(51) Int. Cl.
*G06F 21/32* (2013.01)

(52) U.S. Cl.
CPC ..................................... *G06F 21/32* (2013.01)

(58) Field of Classification Search
CPC ....................................................... G06F 21/32
See application file for complete search history.

(56) References Cited

U.S. PATENT DOCUMENTS

| | | | | |
|---|---|---|---|---|
| 6,526,396 B1 * | 2/2003 | Hiratsuka | ............ | G06V 10/764 |
| | | | | 382/116 |
| D564,511 S * | 3/2008 | Akhtar | .......................... | D30/109 |
| 7,486,810 B1 * | 2/2009 | Accapadi | ................ | G06F 21/32 |
| | | | | 382/124 |
| 10,650,218 B2 * | 5/2020 | Kapinos | ............. | G06V 40/1353 |

(Continued)

FOREIGN PATENT DOCUMENTS

| | | | | | |
|---|---|---|---|---|---|
| CN | 1537279 | A | * | 10/2004 | ............. G06F 21/79 |
| CN | 101689994 | A | * | 3/2010 | ............. G06F 21/32 |

(Continued)

OTHER PUBLICATIONS

Buzzi, M., "Microsoft Modern Keyboard with Fingerprint ID Review," PCMag, https://www.pcmag.com/reviews/microsoft-modern-keyboard-with-fingerprint-id, Apr. 9, 2020, 13 pages.

(Continued)

*Primary Examiner* — John B King

(74) *Attorney, Agent, or Firm* — Edell, Shapiro & Finnan, LLC

(57) ABSTRACT

A method comprises: at a workstation with a biometric keyboard that has keys with fingerprint readers: accepting a login to the workstation by a first user; receiving, from the fingerprint readers, first fingerprint readings indictive of first fingerprints of the first user responsive to typing on the keys by the first user; upon first determining the first fingerprint readings match known first fingerprints for the first user, authenticating the first user as an authorized user; receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the workstation.

20 Claims, 9 Drawing Sheets

(56) References Cited

U.S. PATENT DOCUMENTS

| | | | | |
|---|---|---|---|---|
| 11,062,414 | B1 * | 7/2021 | Konrardy | G05D 1/646 |
| 11,706,214 | B2 | 7/2023 | Szigeti et al. | |
| 2003/0158756 | A1 * | 8/2003 | Abramson | G16H 10/60 |
| | | | | 705/3 |
| 2003/0161502 | A1 * | 8/2003 | Morihara | G06V 40/1335 |
| | | | | 382/115 |
| 2004/0075590 | A1 * | 4/2004 | Pearson | G06F 21/32 |
| | | | | 340/5.83 |
| 2004/0236701 | A1 | 11/2004 | Beenau et al. | |
| 2006/0117188 | A1 * | 6/2006 | Fiske | G07C 9/37 |
| | | | | 713/186 |
| 2006/0224645 | A1 * | 10/2006 | Kadi | G06F 3/0238 |
| | | | | 708/200 |
| 2007/0241861 | A1 * | 10/2007 | Venkatanna | G06F 21/40 |
| | | | | 340/5.52 |
| 2008/0084972 | A1 * | 4/2008 | Burke | H04L 63/126 |
| | | | | 379/88.02 |
| 2009/0134972 | A1 * | 5/2009 | Wu, Jr. | G06F 21/31 |
| | | | | 340/5.82 |
| 2010/0280905 | A1 * | 11/2010 | Rothschild | G06Q 30/02 |
| | | | | 705/14.62 |
| 2012/0293598 | A1 * | 11/2012 | Campbell, III | G06Q 30/02 |
| | | | | 348/14.01 |
| 2013/0247156 | A1 * | 9/2013 | Savo | G06F 21/6218 |
| | | | | 726/4 |
| 2015/0138332 | A1 | 5/2015 | Cheng et al. | |
| 2016/0180068 | A1 | 6/2016 | Das et al. | |
| 2016/0371540 | A1 | 12/2016 | Pabbichetty | |
| 2017/0010771 | A1 * | 1/2017 | Bernstein | G06F 1/1613 |
| 2017/0011227 | A1 * | 1/2017 | Tse | G06F 21/31 |
| 2017/0228582 | A1 * | 8/2017 | Li | G06V 40/12 |
| 2018/0041506 | A1 | 2/2018 | Han et al. | |
| 2019/0227639 | A1 | 7/2019 | Chen et al. | |
| 2019/0354661 | A1 * | 11/2019 | Lu | G06F 21/84 |
| 2020/0153872 | A1 | 5/2020 | Drako et al. | |
| 2020/0294339 | A1 | 9/2020 | Rao et al. | |
| 2020/0322330 | A1 | 10/2020 | Lynn et al. | |
| 2020/0344238 | A1 | 10/2020 | Ainsworth et al. | |
| 2021/0118320 | A1 | 4/2021 | Schmidt | |
| 2023/0344830 | A1 | 10/2023 | Szigeti et al. | |

FOREIGN PATENT DOCUMENTS

| | | | | |
|---|---|---|---|---|
| CN | 106529354 A | | 3/2017 | |
| EP | 0636996 A2 * | 2/1995 | | G06V 40/12 |
| GB | 2360618 A * | 9/2001 | | G06F 21/32 |
| GB | 2481779 A * | 1/2012 | | G06V 40/13 |
| KR | 20220009140 A | | 1/2022 | |
| WO | WO-2022048319 A1 * | 3/2022 | | G06F 21/32 |
| WO | WO-2022224107 A1 * | 10/2022 | | G09F 9/30 |

OTHER PUBLICATIONS

Lenovo, "Lenovo Fingerprint Biometric USB Mouse," Lenovo US, retrieved from https://www.lenovo.com/us/en/p/accessories-and-software/keyboards-and-mice/mice/4y50q64661, Feb. 9, 2024, 3 pages.

* cited by examiner

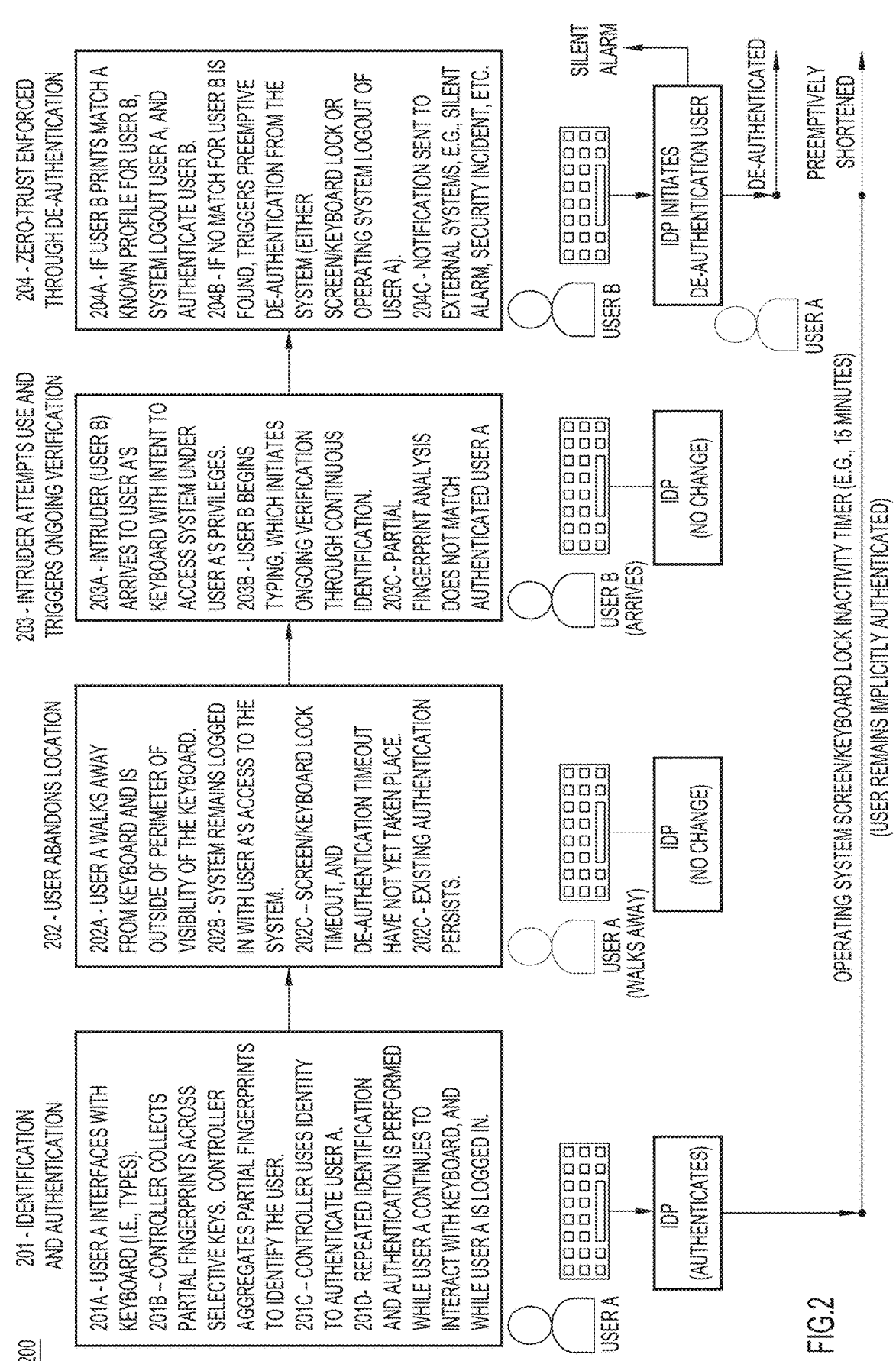

201 - IDENTIFICATION AND AUTHENTICATION

201A - USER A INTERFACES WITH KEYBOARD (I.E., TYPES).
201B - CONTROLLER COLLECTS PARTIAL FINGERPRINTS ACROSS SELECTIVE KEYS. CONTROLLER AGGREGATES PARTIAL FINGERPRINTS TO IDENTIFY THE USER.
201C - CONTROLLER USES IDENTITY TO AUTHENTICATE USER A.
201D - REPEATED IDENTIFICATION AND AUTHENTICATION IS PERFORMED WHILE USER A CONTINUES TO INTERACT WITH KEYBOARD, AND WHILE USER A IS LOGGED IN.

USER A

IDP (AUTHENTICATES)

202 - USER ABANDONS LOCATION

202A - USER A WALKS AWAY FROM KEYBOARD AND IS OUTSIDE OF PERIMETER OF VISIBILITY OF THE KEYBOARD.
202B - SYSTEM REMAINS LOGGED IN WITH USER A'S ACCESS TO THE SYSTEM.
202C - SCREEN/KEYBOARD LOCK TIMEOUT, AND DE-AUTHENTICATION TIMEOUT HAVE NOT YET TAKEN PLACE.
202C - EXISTING AUTHENTICATION PERSISTS.

USER A (WALKS AWAY)

IDP (NO CHANGE)

203 - INTRUDER ATTEMPTS USE AND TRIGGERS ONGOING VERIFICATION

203A - INTRUDER (USER B) ARRIVES TO USER A'S KEYBOARD WITH INTENT TO ACCESS SYSTEM UNDER USER A'S PRIVILEGES.
203B - USER B BEGINS TYPING, WHICH INITIATES ONGOING VERIFICATION THROUGH CONTINUOUS IDENTIFICATION.
203C - PARTIAL FINGERPRINT ANALYSIS DOES NOT MATCH AUTHENTICATED USER A

USER B (ARRIVES)

IDP (NO CHANGE)

204 - ZERO-TRUST ENFORCED THROUGH DE-AUTHENTICATION

204A - IF USER B PRINTS MATCH A KNOWN PROFILE FOR USER B, SYSTEM LOGOUT USER A, AND AUTHENTICATE USER B.
204B - IF NO MATCH FOR USER B IS FOUND, TRIGGERS PREEMPTIVE DE-AUTHENTICATION FROM THE SYSTEM (EITHER SCREEN/KEYBOARD LOCK OR OPERATING SYSTEM LOGOUT OF USER A).
204C - NOTIFICATION SENT TO EXTERNAL SYSTEMS, E.G., SILENT ALARM, SECURITY INCIDENT, ETC.

SILENT ALARM

USER B

IDP INITIATES DE-AUTHENTICATION USER

USER A

DE-AUTHENTICATED

PREEMPTIVELY SHORTENED

OPERATING SYSTEM SCREEN/KEYBOARD LOCK INACTIVITY TIMER (E.G., 15 MINUTES)
(USER REMAINS IMPLICITLY AUTHENTICATED)

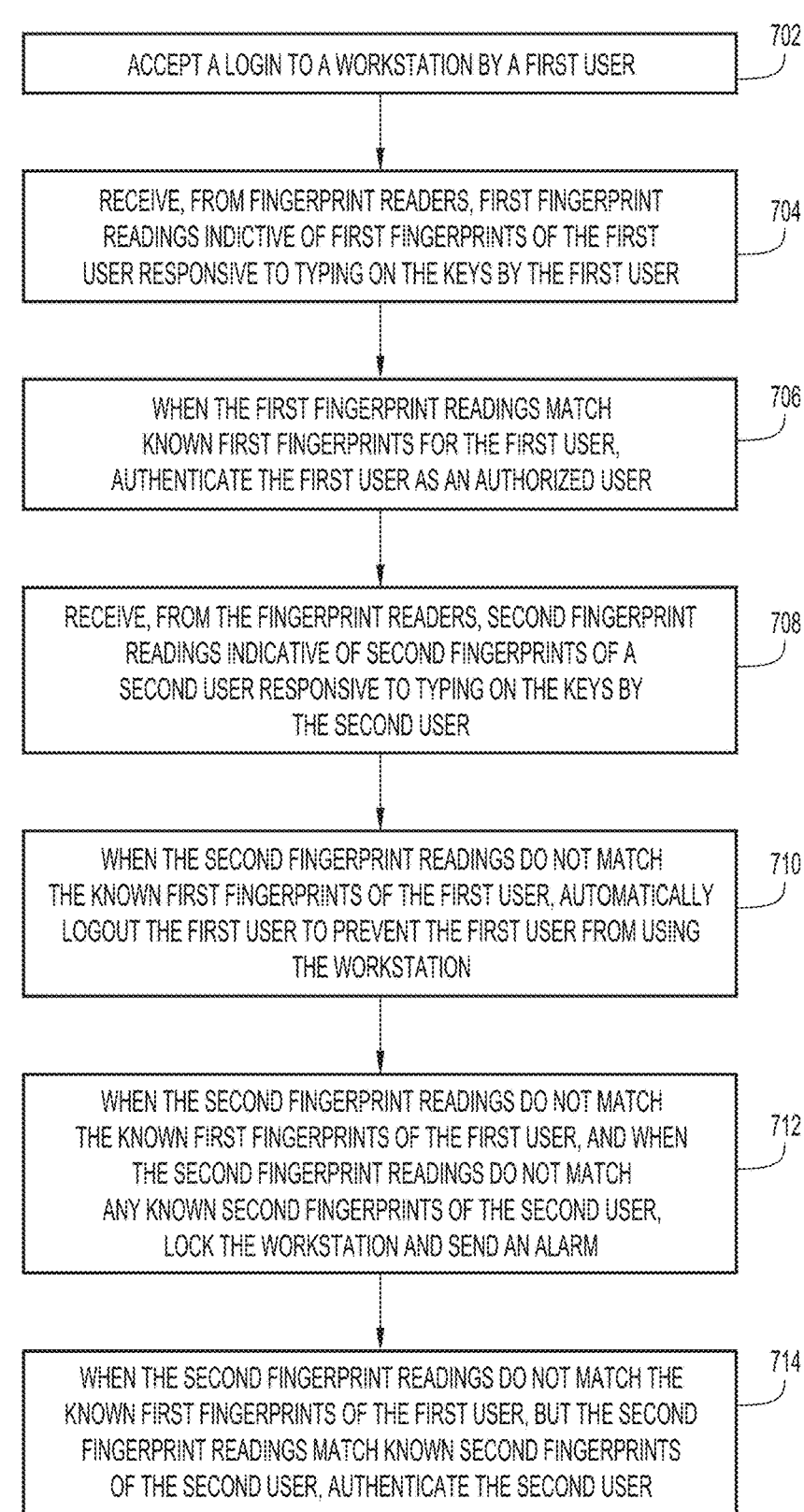

700

702 — ACCEPT A LOGIN TO A WORKSTATION BY A FIRST USER

704 — RECEIVE, FROM FINGERPRINT READERS, FIRST FINGERPRINT READINGS INDICTIVE OF FIRST FINGERPRINTS OF THE FIRST USER RESPONSIVE TO TYPING ON THE KEYS BY THE FIRST USER

706 — WHEN THE FIRST FINGERPRINT READINGS MATCH KNOWN FIRST FINGERPRINTS FOR THE FIRST USER, AUTHENTICATE THE FIRST USER AS AN AUTHORIZED USER

708 — RECEIVE, FROM THE FINGERPRINT READERS, SECOND FINGERPRINT READINGS INDICATIVE OF SECOND FINGERPRINTS OF A SECOND USER RESPONSIVE TO TYPING ON THE KEYS BY THE SECOND USER

710 — WHEN THE SECOND FINGERPRINT READINGS DO NOT MATCH THE KNOWN FIRST FINGERPRINTS OF THE FIRST USER, AUTOMATICALLY LOGOUT THE FIRST USER TO PREVENT THE FIRST USER FROM USING THE WORKSTATION

712 — WHEN THE SECOND FINGERPRINT READINGS DO NOT MATCH THE KNOWN FIRST FINGERPRINTS OF THE FIRST USER, AND WHEN THE SECOND FINGERPRINT READINGS DO NOT MATCH ANY KNOWN SECOND FINGERPRINTS OF THE SECOND USER, LOCK THE WORKSTATION AND SEND AN ALARM

714 — WHEN THE SECOND FINGERPRINT READINGS DO NOT MATCH THE KNOWN FIRST FINGERPRINTS OF THE FIRST USER, BUT THE SECOND FINGERPRINT READINGS MATCH KNOWN SECOND FINGERPRINTS OF THE SECOND USER, AUTHENTICATE THE SECOND USER

FIG.7

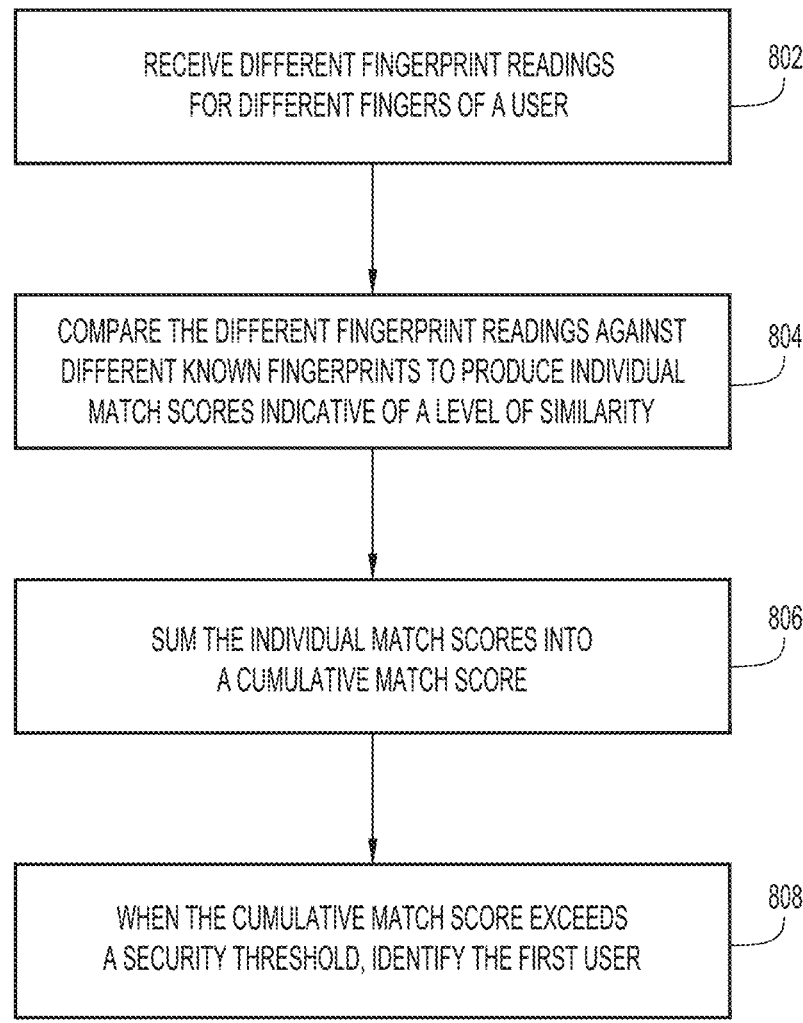

800

RECEIVE DIFFERENT FINGERPRINT READINGS
FOR DIFFERENT FINGERS OF A USER                    802

COMPARE THE DIFFERENT FINGERPRINT READINGS AGAINST
DIFFERENT KNOWN FINGERPRINTS TO PRODUCE INDIVIDUAL
MATCH SCORES INDICATIVE OF A LEVEL OF SIMILARITY        804

SUM THE INDIVIDUAL MATCH SCORES INTO
A CUMULATIVE MATCH SCORE                            806

WHEN THE CUMULATIVE MATCH SCORE EXCEEDS
A SECURITY THRESHOLD, IDENTIFY THE FIRST USER        808

FIG.8

SECURITY TECHNIQUES FOR BIOMETRIC KEYBOARD WITH CONTINUOUS READING FROM IN-LINE FINGERPRINT SENSORS

TECHNICAL FIELD

The present disclosure relates to security methods used with biometric keyboards to identify users.

BACKGROUND

Prompting a user for biometrics is often an interrupt driven process. Fingerprint scanning may be used to provide multi-factor authentication via biometrics, but fingerprint readers are often embedded on non-typing keys of a keyboard. In this case, a user inconveniently repositions his or her hands onto the fingerprint reader, and waits for a fingerprint reading result. Conventional keyboard fingerprint scanning techniques do not provide full identity and authentication protection in a convenient, seamless, and efficient manner.

BRIEF DESCRIPTION OF THE DRAWINGS

FIG. 2 is a flow diagram of a method of zero-trust enforcement with repeated identity detection and authentication using the biometric keyboard, according to an example embodiment.

FIG. 7 is a flowchart of a method of identifying and authenticating users using a biometric keyboard, according to an example embodiment.

FIG. 8 is a flowchart of a method of matching fingerprints performed at a workstation with a biometric keyboard, according to an example embodiment.

DETAILED DESCRIPTION

Overview

In an embodiment, a method comprises: at a workstation with a biometric keyboard that has keys with fingerprint readers: accepting a login to the workstation by a first user; receiving, from the fingerprint readers, first fingerprint readings indictive of first fingerprints of the first user responsive to typing on the keys by the first user; upon first determining the first fingerprint readings match known first fingerprints for the first user, authenticating the first user as an authorized user; receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the workstation.

Example Embodiments

Figure 1:
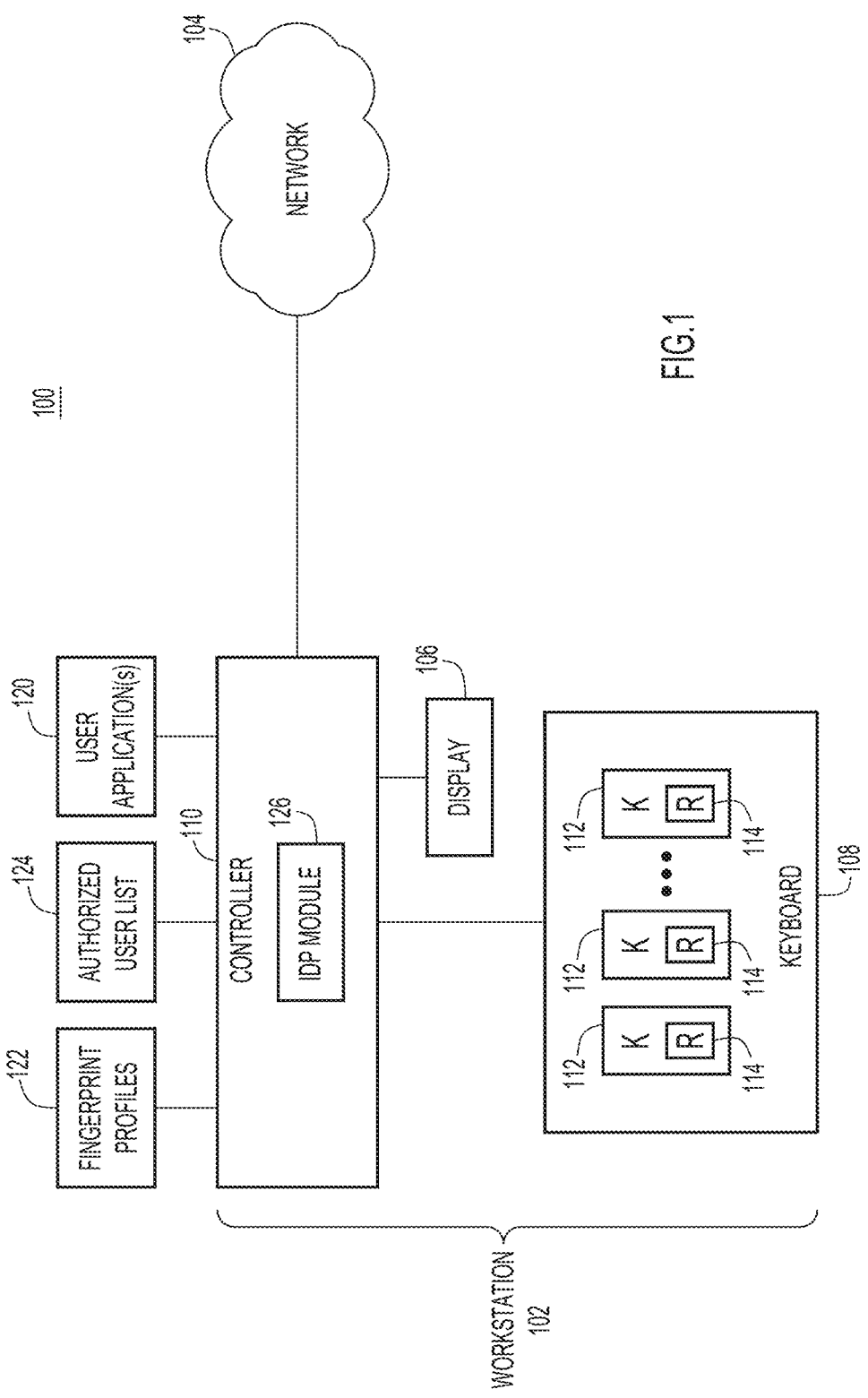
FIG. 1 is a diagram of a computer environment in which security techniques using a biometric keyboard with continuous reading from in-line fingerprint sensors may be implemented, according to an example embodiment.

FIG. 1 is a diagram of an example computer environment 100 in which security techniques using a biometric keyboard with continuous reading from in-line fingerprint sensors (also referred to as "fingerprint readers") may be implemented. Computer environment 100 includes a computer device or workstation 102 coupled with network 104 over which the workstation may communicate. Network 104 may include one or more wide area networks (WANs), such as the Internet, and one or more local area networks (LANs). Workstation 102 includes a display 106, a biometric keyboard 108, and a controller 110 coupled to and configured to communicate with the display and the biometric keyboard. Biometric keyboard 108 includes biometric keys 112 (also denoted as biometric keys K) on which a user may type to interface with controller 110. Biometric keys 112 include fingerprint readers 114 (also denoted as fingerprint readers R) embedded in, or in-line with, the biometric keys. Biometric keys 112 and fingerprint readers 114 are electrically coupled to controller 110 and configured to transmit to the controller key-specific signals when pressed by a user, as is known. The signals convey the identities of the pressed keys and fingerprint readings made by fingerprint readers 114. In an example, biometric keys 112 may include lettered and numbered keys of biometric keyboard 108, such as QWERTY keys, a spacebar, and so on.

Fingerprint readers 114 are configured to read or detect fingerprints on fingers that touch the fingerprint readers, and transmit the read/detected fingerprints to controller 110. In an example, fingerprint readers 114 transmit the detected fingerprints (i.e., "fingerprint reads") as fingerprint image information (i.e., "fingerprint images") to controller 110. Biometric keys 112 and their interfaces to controller 110 may be configured according to any known or hereafter developed biometric keys and corresponding interfaces for a biometric keyboard.

Workstation 102 hosts or otherwise has access to a user application 120, fingerprint profiles 122, and an authorized user list 124. Workstation 102 also hosts an identity provider (IDP) 126 (also referred to as an "IDP module") configured to identify and authenticate users based on their fingerprint readings (i.e., received fingerprint images), fingerprint profiles 122, and authorized user list 124, as described below. Fingerprint profiles 122 includes predetermined fingerprint profiles for corresponding users. A fingerprint profile includes known fingerprint images for different fingers of a left hand and a right hand of a user. Thus, a full fingerprint profile for the user includes up to ten different known fingerprints (e.g., for the index fingers, middle fingers, ring fingers, thumbs, and so on). The fingerprint profile is mapped to an identity of the user (i.e., a user identity, such as a user name or other unique user identifier). Authorized user list 124 lists users who are authorized to use workstation 102, user application 120, and other services accessible through the workstation. For example, authorized user list 124 includes user identities of the users who are authorized for such access.

At a high level, as a user repeatedly types on biometric keys 112, IDP 126 repeatedly collects/receives from fingerprint readers 114 fingerprint readings (i.e., received fingerprint images) in real-time. To identify the user, IDP 126 searches fingerprint profiles 122 for a fingerprint profile that matches the fingerprint readings. When a matching fingerprint profile is found, IDP 126 accesses a user identity associated with the fingerprint profile. Next, IDP 126 searches for the user identity in authorized user list 124. When a matching user identity is found, IDP 126 authenticates the user to the entities for which the user identity is authorized (e.g., to workstation 102, user application 120, and so on). By performing always-on and continuous biometric reading using biometric keyboard 108, the user can provide multi-factor authentication without having to otherwise relocate his or her hands to a dedicated fingerprint reader that is not a usual typing key or perform additional inconvenient movements or tasks. Other identification and authentication techniques are described in further detail below.

FIG. 2 is a flow diagram of an example method 200 of zero-trust enforcement with repeated identity detection and authentication using biometric keyboard 108.

A user, i.e., user A, performs a successful login onto workstation 102. This may include a successful login into user application 120. At 201, IDP 126 identifies and authenticates user A using the following operations. At 201A, user A interfaces with (i.e., finger-types on) biometric keys 112. At 201B, IDP 126 collects/receives partial fingerprint readings across biometric keys 112. This can occur often when fast typing results in a partial hit of a fingertip on a fingerprint reader. IDP 126 aggregates/accumulates the partial fingerprint readings into a cumulative fingerprint reading, as will be described below. At 201C, IDP 126 identifies user A based on the fingerprint profiles 122 and the aforementioned cumulative fingerprint reading. That is, IDP 126 determines that the cumulative fingerprint matches a pre-stored fingerprint profile for user A. IDP 126 access the identity of user A from the fingerprint profile. At 201D, IDP 126 authenticates user A using the identity of user A against authorized user list 124. That is, IDP 126 searches for and finds the identity of user A in authorized user list 124. Authorized user list 124 lists the various entities to which user A is authorized.

At 202, user A abandons his or her location near biometric keyboard 108, as follows. At 202A, user A stops typing on biometric keyboard 108. At 202B, user A remains logged in at workstation 102 and user application 120. At 202C, predetermined inactivity timeout periods (e.g., 15 minutes) for a workstation screen/keyboard lock, an operating system lock, and for de-authentication of user A have not yet occurred/taken place. Therefore, user A's existing authentication persist.

At 203, an intruder, i.e., user B, attempts to use workstation 102 in user A's absence, which triggers ongoing verification through biometric keyboard 108. At 203A, the intruder, user B, arrives at biometric keyboard 108 with an intent to access various systems (collectively "the system") under user A's privileges. At 203B, user B begins typing on biometric keys 112, which initiates ongoing identification and authentication as described above. At 203C, partial fingerprint analysis performed by IDP 126 for user B (i.e., on fingerprint readings of user B) does not match the fingerprint profile of authenticated user A.

At 204, zero-trust is enforced through de-authentication of user A, as follows. IDP 126 determines whether the fingerprint readings for user B match a fingerprint profile for user B in fingerprint profiles 122. At 204A, when the fingerprint readings for user B match a fingerprint profile of user B, IDP 126 (i) performs of an automatic logout of user A from the system (e.g., from workstation 102 and user application 120), (ii) de-authenticates user A, (iii) retrieves an identity of user B from the fingerprint profile for user B, and (iv) uses the identity of user B to authenticate user B. On the other hand, when the fingerprint readings for user B do not match a fingerprint profile for user B, at 204B, IDP 126 (i) performs a logout of user A from the system (e.g., from workstation 102 and user application 120), (ii) de-authenticates user A, and (iii) locks features of workstation 102, e.g., display 106, biometric keyboard 108, and/or the operating system. At 204C, IDP 126 sends a notification that user B is attempting to access the system, e.g., sends a silent alarm, security incident, and so on.

Figure 3:
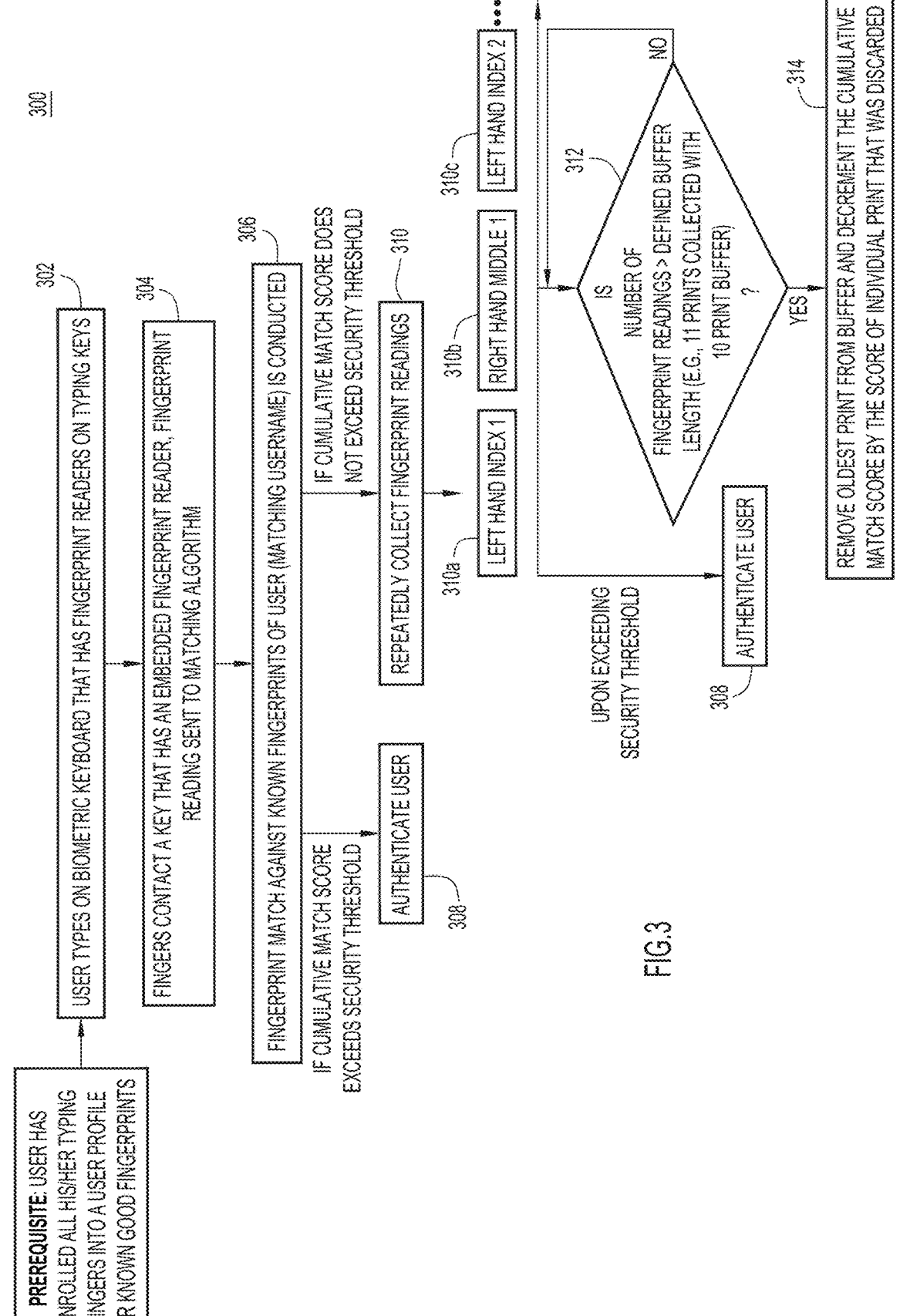
FIG. 3 is a flowchart of a method of partial fingerprint matching performed on a user typing on the biometric keyboard, according to an example embodiment.

FIG. 3 is a flowchart of an example method 300 of partial fingerprint matching performed on a user typing on biometric keyboard 108. An a priori configuration action stores into a fingerprint profile for the user individual known images of the fingerprints (i.e., known fingerprint images) for fingers of the user that are used for typing.

At 302, an authentication prompt is presented to the user on display 106. In response, the user types on biometric keys 112. At 304, a user's finger contacts one of biometric keys 112, which triggers the fingerprint reader in that biometric key to capture a fingerprint reading, and transmit the fingerprint readings to IDP 126. IDP 126 stores the fingerprint reading in a fingerprint buffer of finite length (e.g., for 10 fingerprint reading slots). The fingerprint reading may convey only a partial fingerprint, i.e., only a portion of the corresponding known fingerprint image that is stored in the fingerprint profile.

At 306, IDP 126 executes fingerprint matching to determine how well the fingerprint reading matches any known fingerprint images. To do this, IDP 126 searches the known fingerprint images for a match to the fingerprint reading, i.e., compares the fingerprint reading against each of the known fingerprint images looking for the match, based on similarity. The compare measures a percentage of fingerprint image area match between the fingerprint reading and the known fingerprint images. The compare produces a match score (also referred to as a "confidence" score), such as a match percentage. The match score ranges from 0% when there is no similarity to 100% when there is a complete or perfect match. IDP 126 sums or accumulates the match score into a cumulative match score, which is initially set equal to zero. IDP 126 compares the cumulative match score to a security threshold. When the cumulative match score exceeds the security threshold indicating a strong/confident match, flow proceeds to 308. When the cumulative match score does not exceed the security threshold indicating there is not a strong match, flow proceeds to 310.

At 308, IDP 126 access a user identity associated with the fingerprint profile, and authenticates the user using the user identity and authorized user list 124, as described above.

At 310, IDP 126 repeatedly collects more fingerprint readings as the user repeatedly types on biometric keys 112, stores the fingerprint readings in the fingerprint buffer, and repeatedly performs the fingerprint matching as described above with each fingerprint reading, to increase the cumulative match score toward the security threshold. For example, at 310a, 310b, and 310c, IDP 126 collects fingerprint readings for a first instance of the left hand index finger, the right hand middle finger, and a second instance of the left hand index finger, respectively, and performs the fingerprint matching for each fingerprint reading.

At any time, when the cumulative match score exceeds the security threshold, flow proceeds to 308. Additionally, at 312, IDP 126 tests whether the fingerprint buffer is full. When the fingerprint buffer if full and upon receiving a next fingerprint reading to be stored, flow proceeds to 314. At 314, IDP 126 removes the oldest fingerprint reading from the fingerprint buffer, decrements the cumulative match score by the individual match score of the discarded fingerprint reading (i.e., the oldest fingerprint reading and its match score), and adds to the cumulative match score the individual match score for the next (most recently received) fingerprint reading. Thus, the fingerprint buffer is configured as a "rolling" buffer or a first-in-first-out (FIFO), and the cumulative match score is implemented as a rolling match score.

Figure 4:
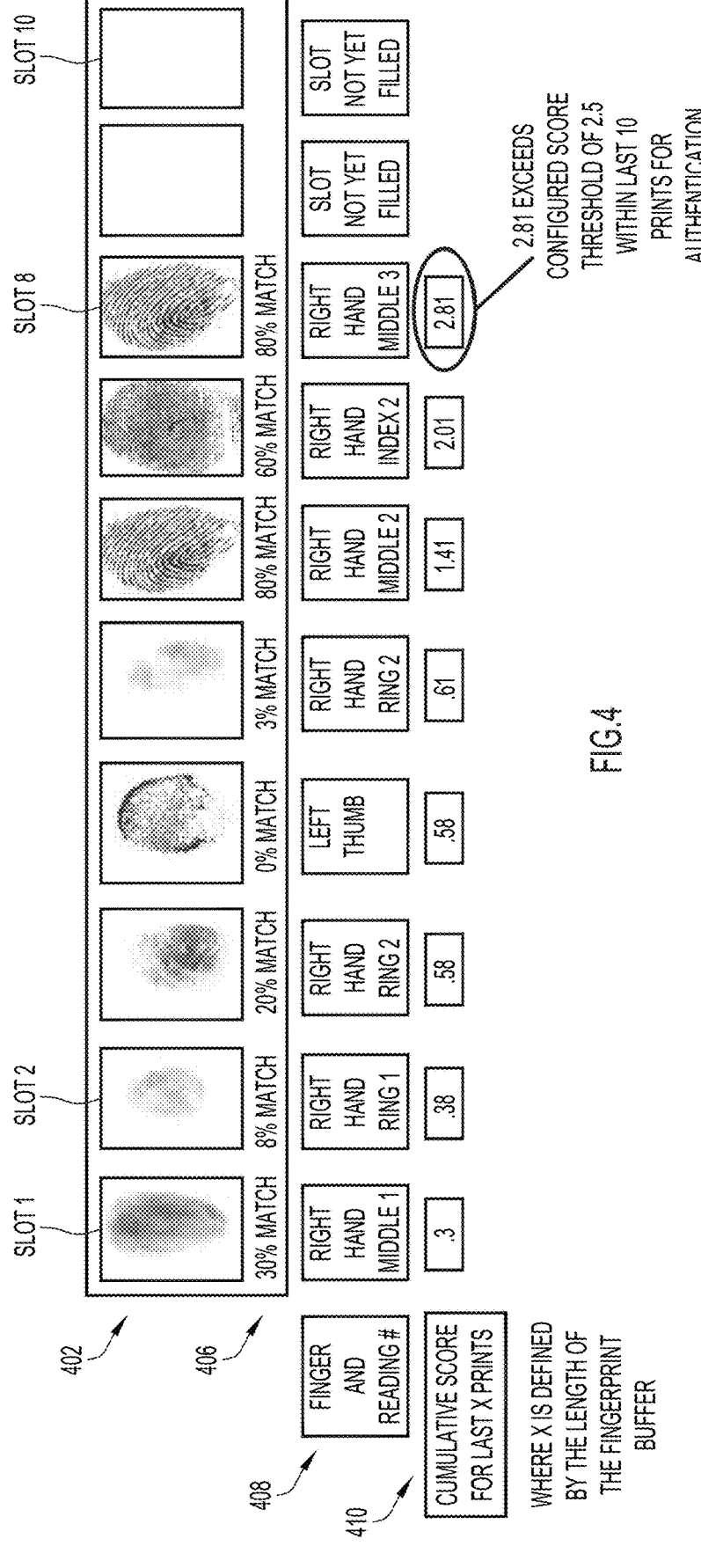
FIG. 4 shows a rolling fingerprint buffer that stores a sequence of fingerprint readings, according to an example embodiment.

FIG. 4 shows an example rolling fingerprint buffer 402 of length N=10 that stores a sequence of 8 fingerprint readings. FIG. 4 shows a first row 406 of percentage match scores produced by IDP 126 corresponding to the fingerprint readings, a second row 408 that identifies the best matching fingers of the user for the fingerprint readings, and a third row 410 that shows cumulative match scores that increase/ grow across the fingerprint readings. For example, (i) the first fingerprint reading has a 30% match to the right hand middle finger, and results in an initial cumulative match score of 0.30 (since it is the first fingerprint reading), (ii) the second fingerprint reading has an 8% match to the right hand ring finger, and results in a cumulative match score of 0.08+0.30=0.38 (since it is the second fingerprint reading), and so on. The eighth fingerprint reading results in a cumulative match score of 2.81, which exceeds a preconfigured security threshold of 2.5.

Figure 5:
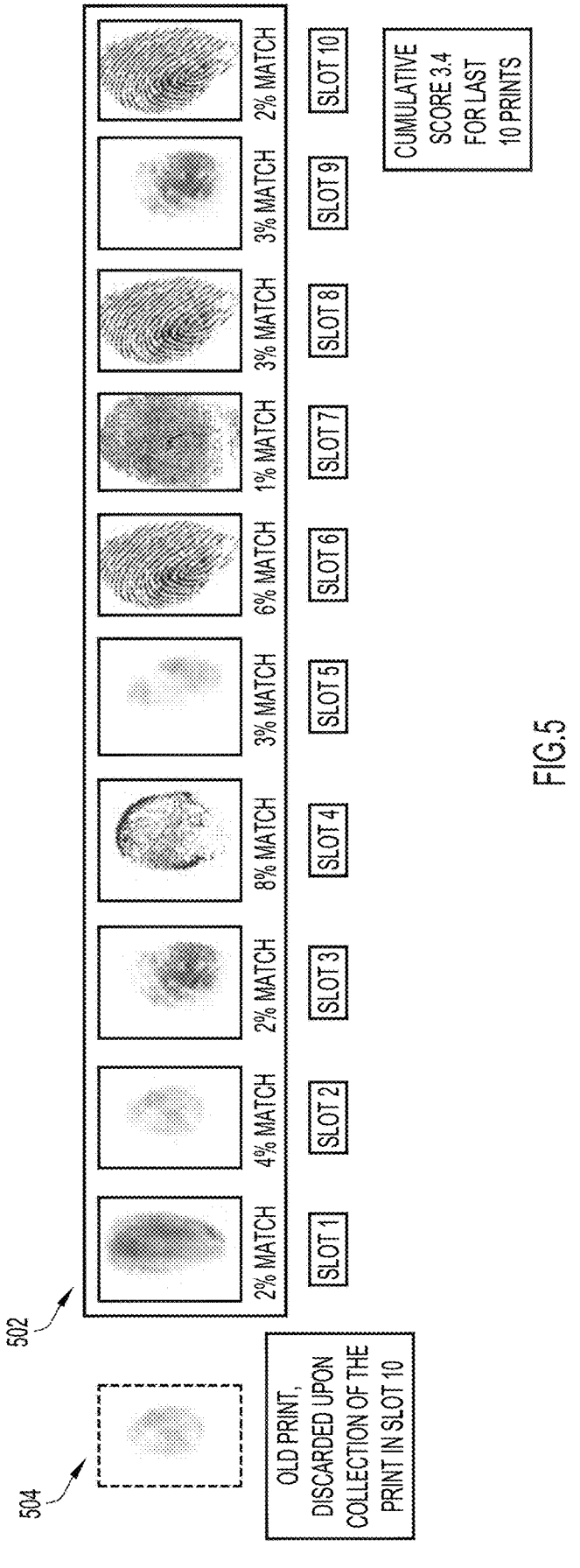
FIG. 5 shows another rolling fingerprint buffer that stores a sequence of fingerprint readings under a buffer overflow condition, according to an example embodiment.

FIG. 5 shows an example rolling fingerprint buffer 502 of length N=10 that stores a sequence of 10 fingerprint readings, at the point when buffer overflow occurs. FIG. 5 shows an oldest fingerprint reading 504 that is discarded upon collection of an $11^{th}$ fingerprint reading. The individual match score for oldest fingerprint reading 504 is decremented from the cumulative match score, and the individual match score for the $11^{th}$ fingerprint reading is summed into the cumulative match score (thereby replacing the older match score). Therefore, only up to N match scores are summed. That is, only a limited number of consecutive match scores are summed (only match scores for fingerprint readings in the rolling buffer are summed), which prevents dozens of 1% readings from successfully authenticating a user.

Figure 6:
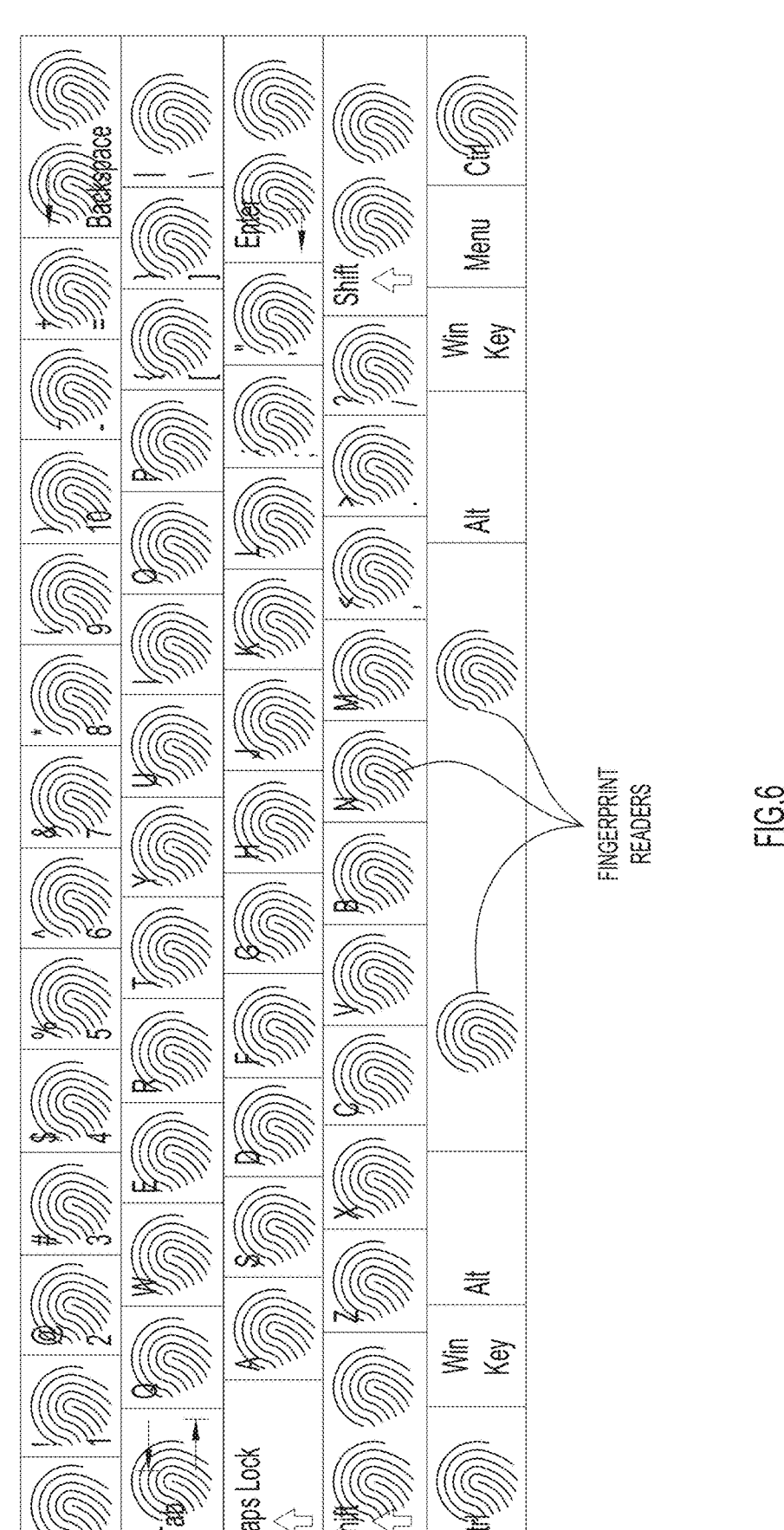
FIG. 6 is an illustration of a biometric keyboard layout that includes biometric keys, according to an example embodiment.

FIG. 6 is an illustration of a biometric keyboard 600 that includes biometric keys. The keyboard is a QWERTY keyboard with fingerprint readers embedded in most of the keys. In other examples, fewer fingerprint readers may be employed.

FIG. 7 is a flowchart of an example method 700 of identifying and authenticating users using a biometric keyboard that has keys with fingerprint readers. Operations of method 700 are described above.

At 702, the workstation accepts a login by a first user.

At 704, the workstation receives, from the fingerprint readers, first fingerprint readings indictive of first fingerprints of the first user responsive to typing on the keys by the first user.

At 706, upon first determining that the first fingerprint readings match known first fingerprints for the first user, the workstation authenticates the first user as an authorized user. For example, upon first determining that the first fingerprint readings match the known first fingerprints, the workstation accesses a user identity of the first user that is mapped to the known first fingerprints, and then authenticates the first user based on the user identity and an authorized user list that includes the user identity.

At 708, the workstation receives, from the fingerprint readers, second fingerprint readings indicative of second fingerprints of a second user responsive to typing on the keys by the second user.

At 710, upon second determining that the second fingerprint readings do not match the known first fingerprints of the first user, the workstation automatically performs a logout of the first user (i.e., performs logging-out of the first user) to prevent the first user from using the workstation.

At 712, upon second determining that the second fingerprint readings do not match the known first fingerprints of the first user, and upon third determining that the second fingerprint readings do not match any known second fingerprints of the second user, the workstation places itself in lockdown. For example, the workstation may lock the screen, the keyboard, and or the operating system of the workstation. Additionally, the workstation may send an alarm to indicate that an unauthorized user is attempting to access the workstation.

At 714, upon second determining that the second fingerprint readings do not match the known first fingerprints of the first user, and upon fourth determining that the second fingerprint readings match known second fingerprints of the second user, the workstation authenticates the second user.

FIG. 8 is a flowchart of an example method 800 of matching fingerprints performed at a workstation with a biometric keyboard that has keys with fingerprint readers.

At 802, the workstation receives different fingerprint readings for different fingers of a user.

At 804, the workstation compares the different fingerprint readings against different known fingerprints to produce individual match scores indicative of levels of similarity.

At 806, the workstation sums the individual match scores into a cumulative match score.

At 808, only upon determining that the cumulative match score exceeds a security threshold indicating that the user is known based on the different fingerprint readings, the workstation identifies the user. In an embodiment, the workstation sums the individual match scores for up to a number N (e.g., 10) of the fingerprint readings in a rolling fashion as the first fingerprint readings are received. Upon receiving N fingerprint readings and then receiving a next (e.g., $11^{th}$) fingerprint reading, the workstation replaces an oldest one of the individual match scores for the fingerprint readings (e.g., for the $10^{th}$ fingerprint reading) with a next match score for the next first fingerprint reading (e.g., for the $11^{th}$ fingerprint reading).

Figure 9:
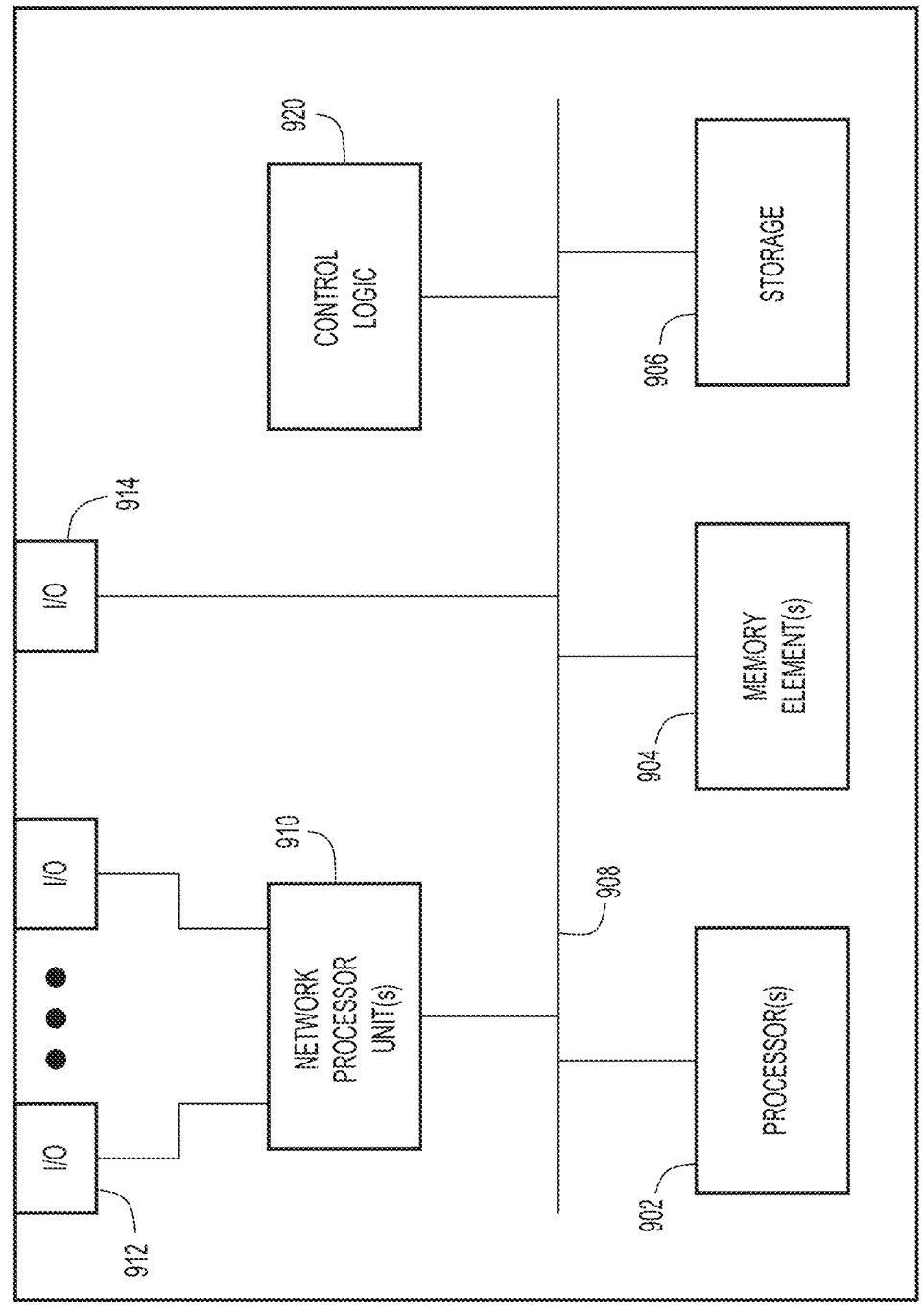
FIG. 9 illustrates a hardware block diagram of a computing device that may perform functions associated with operations performed in the embodiments presented herein, according to an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device or apparatus, such as computing device 900 or any combination of computing devices 900, may be configured as any entity/entities as discussed for the techniques depicted in connection with FIGS. 1-8 in order to perform operations of the various techniques discussed herein. For example, computing device may represent controller 110 of workstation 102, for example.

In at least one embodiment, the computing device 900 may be any apparatus that may include one or more processor(s) 902, one or more memory element(s) 904, storage 906, a bus 908, one or more network processor unit(s) 910 interconnected with one or more network input/output (I/O)

interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard (which may be biometric), keypad (which may be biometric), a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations (including generating GUIs for display and interacting with the GUIs) in accordance with teachings of the present disclosure.

In some instances, software of the present embodiments may be available via a non-transitory computer usable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, domains, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: at a workstation with a biometric keyboard that has keys with fingerprint readers: accepting a login to the workstation by a first user; receiving, from the fingerprint readers, first fingerprint readings indictive of first fingerprints of the first user responsive to typing on the keys by the first user; upon first determining that the first fingerprint readings match known first fingerprints for the first user, authenticating the first user as an authorized user; receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the workstation.

In some aspects, the techniques described herein relate to a method, further including: upon second determining that the second fingerprint readings do not match the known first fingerprints of the first user, and upon third determining that the second fingerprint readings do not match any known second fingerprints of the second user, locking the workstation.

In some aspects, the techniques described herein relate to a method, further including: upon second determining that the second fingerprint readings do not match the known first fingerprints of the first user, and upon third determining that the second fingerprint readings do not match any known second fingerprints of the second user, sending an alarm to indicate that an unauthorized user is attempting to access the workstation.

In some aspects, the techniques described herein relate to a method, further including: upon second determining that the second fingerprint readings do not match the known first fingerprints of the first user, and upon third determining that the second fingerprint readings match known second fingerprints of the second user, authenticating the second user.

In some aspects, the techniques described herein relate to a method, further including: upon first determining that the first fingerprint readings match the known first fingerprints, accessing a user identity of the first user that is mapped to the known first fingerprints, wherein authenticating includes authenticating the first user based on the user identity and an authorized user list that includes the user identity.

In some aspects, the techniques described herein relate to a method, wherein: the known first fingerprints include different known fingerprints for different fingers of the first user; receiving the first fingerprint readings includes receiving the first fingerprint readings to include different first fingerprint readings for the different fingers of the first user; and first determining includes comparing the different first fingerprint readings against the different known fingerprints.

In some aspects, the techniques described herein relate to a method, wherein comparing produces individual match scores that indicate a level of similarity between the different first fingerprint readings and the different known fingerprints, and wherein first determining further includes: summing the individual match scores into a cumulative match score; and when the cumulative match score exceeds a security threshold, identifying the first user.

In some aspects, the techniques described herein relate to a method, wherein: summing includes summing the individual match scores for up to a number N of the first fingerprint readings in a rolling fashion as the first fingerprint readings are received, wherein the method further includes, upon receiving the number N of the first fingerprint readings and then receiving a next first fingerprint reading, replacing an oldest one of the individual match scores for the first fingerprint readings with a next match score for the next first fingerprint reading.

In some aspects, the techniques described herein relate to a method, wherein the keys with the fingerprint readers include lettered and numbered keys of the biometric keyboard.

In some aspects, the techniques described herein relate to an apparatus including: a network interface to communicate with a network; a biometric keyboard that has keys with fingerprint readers; and a processor coupled to the network interface and the biometric keyboard and configured to perform: accepting a login to the apparatus by a first user; receiving, from the fingerprint readers, first fingerprint readings indictive of first fingerprints of the first user responsive to typing on the keys by the first user; upon first determining the first fingerprint readings match known first fingerprints for the first user, authenticating the first user as an authorized user; receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the apparatus.

In some aspects, the techniques described herein relate to an apparatus, wherein the processor is further configured to perform: upon second determining that the second fingerprint readings do not match the known first fingerprints of the first user, and upon third determining that the second fingerprint readings do not match any known second fingerprints of the second user, locking the apparatus.

In some aspects, the techniques described herein relate to an apparatus, wherein the processor is further configured to perform: upon second determining that the second fingerprint readings do not match the known first fingerprints of the first user, and upon third determining that the second fingerprint readings do not match any known second fingerprints of the second user, sending an alarm to indicate that an unauthorized user is attempting to access the apparatus.

In some aspects, the techniques described herein relate to an apparatus, further including: upon second determining that the second fingerprint readings do not match the known first fingerprints of the first user, and upon third determining that the second fingerprint readings match known second fingerprints of the second user, authenticating the second user.

In some aspects, the techniques described herein relate to an apparatus, wherein the processor is further configured to perform: upon first determining that the first fingerprint readings match the known first fingerprints, accessing a user identity of the first user that is mapped to the known first fingerprints, wherein the processor is configured to perform authenticating by authenticating the first user based on the user identity and an authorized user list that includes the user identity.

In some aspects, the techniques described herein relate to an apparatus, wherein: the known first fingerprints include different known fingerprints for different fingers of the first user; the processor is configured to perform receiving the first fingerprint readings by receiving the first fingerprint readings to include different first fingerprint readings for the different fingers of the first user; and the processor is configured to perform first determining by comparing the different first fingerprint readings against the different known fingerprints.

In some aspects, the techniques described herein relate to an apparatus, wherein the processor is configured to perform comparing to produce individual match scores that indicate a level of similarity between the different first fingerprint readings and the different known fingerprints, and wherein the processor is configured to perform first determining by: summing the individual match scores into a cumulative match score; and when the cumulative match score exceeds a security threshold, identifying the first user.

In some aspects, the techniques described herein relate to an apparatus, wherein: wherein the processor is configured to perform summing by summing the individual match scores for up to a number N of the first fingerprint readings in a rolling fashion as the first fingerprint readings are received, wherein the processor is further configured to perform, upon receiving the number N of the first fingerprint readings and then receiving a next first fingerprint reading, replacing an oldest one of the individual match scores for the first fingerprint readings with a next match score for the next first fingerprint reading.

In some aspects, the techniques described herein relate to a non-transitory computer readable medium encoded with instructions that, when executed by a processor of a workstation with a biometric keyboard that has keys with fingerprint readers, causes the processor to perform: accepting a login to the workstation by a first user; receiving, from the fingerprint readers, first fingerprint readings indictive of first fingerprints of the first user responsive to typing on the keys by the first user; upon first determining the first fingerprint readings match known first fingerprints for the first user, authenticating the first user as an authorized user; receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the workstation.

In some aspects, the techniques described herein relate to a non-transitory computer readable medium, further including instructions to cause the processor to perform: upon second determining that the second fingerprint readings do not match the known first fingerprints of the first user, and upon third determining that the second fingerprint readings do not match any known second fingerprints of the second user, locking the workstation.

In some aspects, the techniques described herein relate to a non-transitory computer readable medium, further including instructions to cause the processor to perform: upon second determining that the second fingerprint readings do not match the known first fingerprints of the first user, and upon third determining that the second fingerprint readings do not match any known second fingerprints of the second user, sending an alarm to indicate that an unauthorized user is attempting to access the workstation.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a workstation with a biometric keyboard that has keys with fingerprint readers:
accepting a login to the workstation by a first user;
receiving, from the fingerprint readers, first fingerprint readings indictive of first fingerprints of the first user responsive to typing on the keys by the first user;
summing individual match scores, which indicate levels of similarity between the first fingerprint readings and known fingerprints, into a cumulative match score in a rolling fashion such that, upon receiving a next fingerprint reading after receiving a predetermined number of the first fingerprint readings, an oldest one of the individual match scores is replaced with a next match score for the next fingerprint reading;
upon first determining that the first fingerprint readings match known first fingerprints for the first user based on the cumulative match score, authenticating the first user as an authorized user;

receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the workstation.

2. The method of claim 1, further comprising:

upon second determining that the second fingerprint readings do not match the known first fingerprints of the first user, and upon third determining that the second fingerprint readings do not match any known second fingerprints of the second user, locking the workstation.

3. The method of claim 2, further comprising:

upon second determining that the second fingerprint readings do not match the known first fingerprints of the first user, and upon third determining that the second fingerprint readings do not match any known second fingerprints of the second user, sending an alarm to indicate that an unauthorized user is attempting to access the workstation.

4. The method of claim 1, further comprising:

upon second determining that the second fingerprint readings do not match the known first fingerprints of the first user, and upon third determining that the second fingerprint readings match known second fingerprints of the second user, authenticating the second user.

5. The method of claim 1, further comprising:

upon first determining that the first fingerprint readings match the known first fingerprints, accessing a user identity of the first user that is mapped to the known first fingerprints, wherein authenticating includes authenticating the first user based on the user identity and an authorized user list that includes the user identity.

6. The method of claim 1, wherein:

the known first fingerprints include different known fingerprints for different fingers of the first user;

receiving the first fingerprint readings includes receiving the first fingerprint readings to include different first fingerprint readings for the different fingers of the first user; and first determining includes comparing the different first fingerprint readings against the different known fingerprints to produce the individual match scores.

7. The method of claim 6, wherein first determining further includes, when the cumulative match score exceeds a security threshold, identifying the first user.

8. The method of claim 7, wherein:

summing includes summing the individual match scores as the first fingerprint readings are received.

9. The method of claim 1, wherein the keys with the fingerprint readers include lettered and numbered keys of the biometric keyboard.

10. An apparatus comprising:

a network interface to communicate with a network;

a biometric keyboard that has keys with fingerprint readers; and a processor coupled to the network interface and the biometric keyboard and configured to perform:

accepting a login to the apparatus by a first user;

receiving, from the fingerprint readers, first fingerprint readings indictive of first fingerprints of the first user responsive to typing on the keys by the first user;

summing individual match scores, which indicate levels of similarity between the first fingerprint readings and known fingerprints, into a cumulative match score in a rolling fashion such that, upon receiving a next fingerprint reading after receiving a predetermined number of the first fingerprint readings, an oldest one of the individual match scores is replaced with a next match score for the next fingerprint reading;

upon first determining the first fingerprint readings match known first fingerprints for the first user based on the cumulative match score, authenticating the first user as an authorized user;

receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the apparatus.

11. The apparatus of claim 10, wherein the processor is further configured to perform:

upon second determining that the second fingerprint readings do not match the known first fingerprints of the first user, and upon third determining that the second fingerprint readings do not match any known second fingerprints of the second user, locking the apparatus.

12. The apparatus of claim 11, wherein the processor is further configured to perform:

upon second determining that the second fingerprint readings do not match the known first fingerprints of the first user, and upon third determining that the second fingerprint readings do not match any known second fingerprints of the second user, sending an alarm to indicate that an unauthorized user is attempting to access the apparatus.

13. The apparatus of claim 10, further comprising:

upon second determining that the second fingerprint readings do not match the known first fingerprints of the first user, and upon third determining that the second fingerprint readings match known second fingerprints of the second user, authenticating the second user.

14. The apparatus of claim 10, wherein the processor is further configured to perform:

upon first determining that the first fingerprint readings match the known first fingerprints, accessing a user identity of the first user that is mapped to the known first fingerprints, wherein the processor is configured to perform authenticating by authenticating the first user based on the user identity and an authorized user list that includes the user identity.

15. The apparatus of claim 10, wherein:

the known first fingerprints include different known fingerprints for different fingers of the first user;

the processor is configured to perform receiving the first fingerprint readings by receiving the first fingerprint readings to include different first fingerprint readings for the different fingers of the first user; and the processor is configured to perform first determining by comparing the different first fingerprint readings against the different known fingerprints to produce the individual match scores.

16. The apparatus of claim 15, wherein the processor is further configured to perform determining by, when the cumulative match score exceeds a security threshold, identifying the first user.

17. The apparatus of claim 16, wherein:

summing includes summing the individual match scores as the first fingerprint readings are received.

18. A non-transitory computer readable medium encoded with instructions that, when executed by a processor of a workstation with a biometric keyboard that has keys with fingerprint readers, causes the processor to perform:

accepting a login to the workstation by a first user;

receiving, from the fingerprint readers, first fingerprint readings indictive of first fingerprints of the first user responsive to typing on the keys by the first user;

summing individual match scores, which indicate levels of similarity between the first fingerprint readings and known fingerprints, into a cumulative match score in a rolling fashion such that, upon receiving a next fingerprint reading after receiving a predetermined number of the first fingerprint readings, an oldest one of the individual match scores is replaced with a next match score for the next fingerprint reading;

upon first determining the first fingerprint readings match known first fingerprints for the first user based on the cumulative match score, authenticating the first user as an authorized user;

receiving, from the fingerprint readers, second fingerprint readings indicative of second fingerprints of a second user responsive to typing on the keys by the second user; and upon second determining that the second fingerprint readings do not match the known first fingerprints of the first user, automatically logging-out the first user to prevent the first user from using the workstation.

19. The non-transitory computer readable medium of claim 18, further comprising instructions to cause the processor to perform:

upon second determining that the second fingerprint readings do not match the known first fingerprints of the first user, and upon third determining that the second fingerprint readings do not match any known second fingerprints of the second user, locking the workstation.

20. The non-transitory computer readable medium of claim 19, further comprising instructions to cause the processor to perform:

upon second determining that the second fingerprint readings do not match the known first fingerprints of the first user, and upon third determining that the second fingerprint readings do not match any known second fingerprints of the second user, sending an alarm to indicate that an unauthorized user is attempting to access the workstation.

* * * * *